Figure 1:
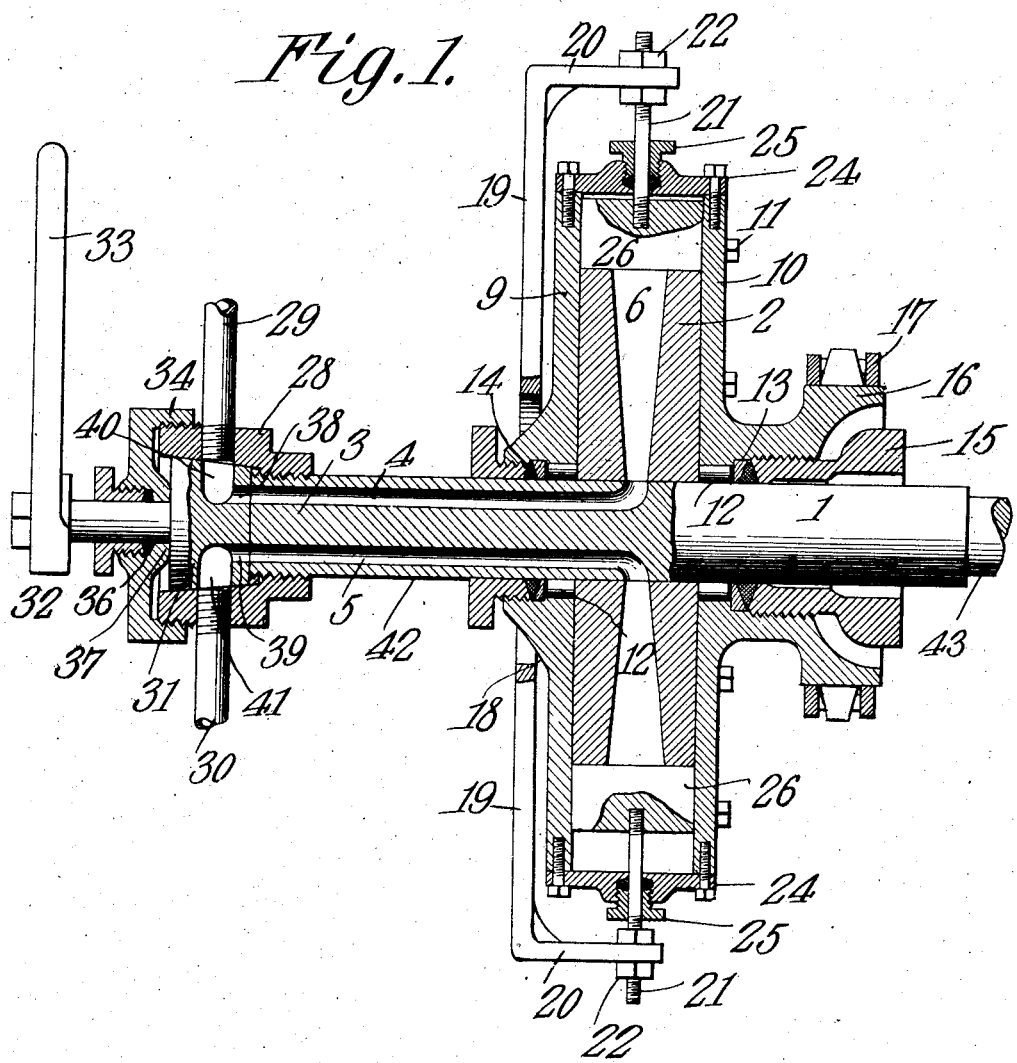

No. 854,001. PATENTED MAY 21, 1907.
L. K. SIVERTSON.
ROTARY ENGINE.
APPLICATION FILED FEB. 28, 1907.

2 SHEETS—SHEET 1.

WITNESSES:
E. F. Stewart
F. T. Chapman

Lucas H. Sivertson,
INVENTOR.
By C. A. Snow & Co.
ATTORNEYS

THE NORRIS PETERS CO., WASHINGTON, D. C.

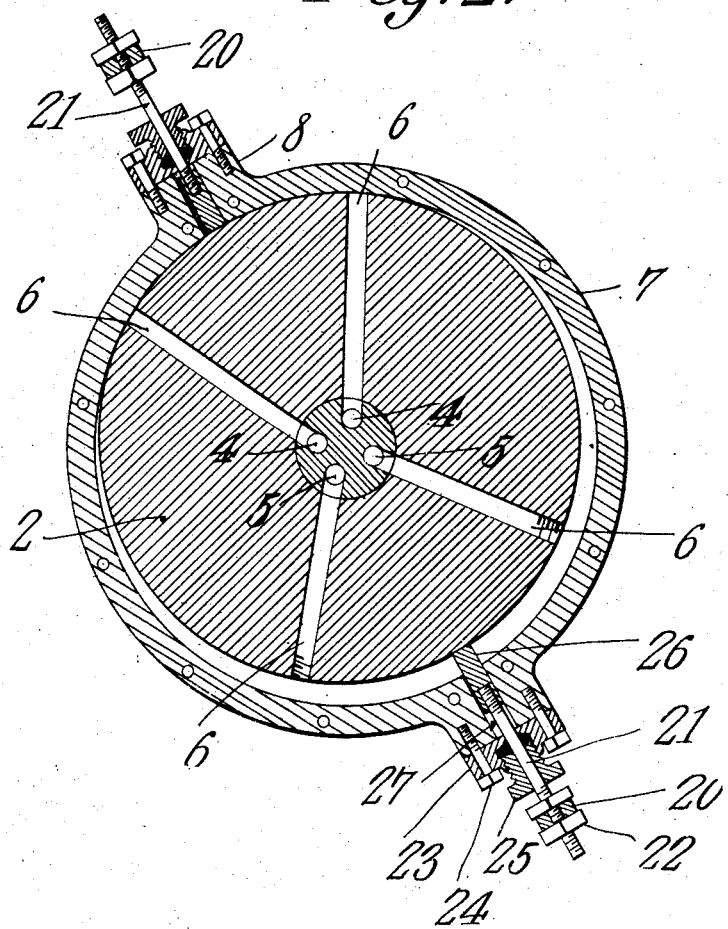

UNITED STATES PATENT OFFICE.

LUCAS K. SIVERTSON, OF WILLOW CITY, NORTH DAKOTA.

ROTARY ENGINE.

No. 854,001.          Specification of Letters Patent.          Patented May 21, 1907.

Application filed February 28, 1907. Serial No. 359,799.

*To all whom it may concern:*

Be it known that I, LUCAS K. SIVERTSON, a citizen of the United States, residing at Willow City, in the county of Bottineau and State of North Dakota, have invented a new and useful Rotary Engine, of which the following is a specification.

This invention has reference to improvements in steam engines, and its object is to produce an engine wherein the internal parts are stationary and constitute a stationary piston-head, while the rotary parts are of simple and light construction yet amply strong for the purpose of transmitting power generated by the steam to the machinery to be driven.

By my invention I am enabled to support the machine upon any type of foundation since no journal bearings are provided and no machine work is necessary in order to provide such foundations; in fact, metal, brick, stone or cement foundations may be used, as desired, without in any way interfering with the operation of the machine.

The invention consists essentially in a stationary shaft which may be supported in any desirable way and through which steam ducts are provided in such manner that the engine may be driven in either direction or stopped. The rotary member of the engine is mounted upon this shaft and the bearings of the rotor are the only portions of the shaft, except the end where steam is admitted, that need be turned or otherwise machined. The rotary member has a driving gear directly attached to it so that power may be transmitted therefrom to the machine to be driven, and this rotary member also carries the valves by which the steam entering the piston-head is directed in the proper direction to cause the rotation of the rotary member in the desired direction.

The invention will be fully understood from the following detailed description taken in connection with the accompanying drawings forming part of this specification, in which,—

Figure 1 is a longitudinal section through the improved engine with parts shown in elevation; and Fig. 2 is a cross section through the stator and rotor of the engine.

Referring to the drawings, there is shown a shaft 1 upon which is mounted an eccentric member 2 which I shall term the stationary piston-head. Leading from one end 3 of the shaft to the piston-head 2 are a number of passages or conduits 4—4 and 5—5, there being two conduits 4 and two conduits 5 equi-distantly disposed with relation to the axis of the shaft 1. These conduits open into passages 6 in the stationary piston-head, which passages extend from the interior of the piston-head to the periphery thereof but are slightly displaced with relation to the radii of said piston-head. These passages also flare in the direction of the thickness of the piston-head, as indicated in Fig. 1.

Surrounding the eccentric piston-head but concentrically located with reference to the shaft 1 is a ring-shaped casing 7 having two diametrically opposite bosses 8 to be hereinafter referred to, and fast upon this casing 7 are two cheek plates 9–10, an appropriate number of bolts 11 being used for this purpose. It will be understood, of course, that the casing 7 and the cheek plate 9 may be formed in one casting and the cheek plate 10 alone be separately formed and bolted to the casing. The two cheek plates and the casing 7 constitute the rotary member of the engine and this rotary member is mounted directly on the axle 1 through the intermediary of roller bearings 12. Both cheek plates 9 and 10 are formed with hubs properly shaped to receive the roller bearings and each cheek plate is provided with a suitable bearing plate 13 and packing 14 and with a packing-retaining gland 15. The hub of the cheek plate 10 is larger than that of the cheek plate 9 and is expanded into a sprocket wheel 16 to which may be applied a sprocket chain 17 to transmit power to the machinery to be driven by the engine. The sprocket wheel 16 is cored out to receive the gland 15 at this end of the rotor, which gland is made of sufficient length for the purpose. Surrounding the hub of the cheek plate 9 there is a ring 18 from which extend in diametrically opposite directions two arms 19—19 having ends 20—20 bent parallel to the axle and overhanging the bosses 8 before referred to. Passing through perforations in the overhanging portions of these arms are the threaded ends of rods 21, adjustably clamped to the arm-ends 20 by clamp nuts 22. These rods 21 pass through heads 23 bolted to the outer ends of the bosses 8, and suitable packing 24 and glands 25 serve to render the passageway for the rods 21 steam-tight. At their inner ends the rods 21 carry rectangular blocks 26 arranged to slide in rectangular openings or passageways 27 radially through the bosses 8. These blocks 26 constitute pistons which may be withdrawn entirely within the bosses 8 and project far enough to make contact with the periphery of the eccentric piston-head 2. In fact, both blocks or pistons 26 are always in contact at diametrically opposite points of the rotor with the periphery of the stationary piston-head 2, being adjusted by the adjustable rods 21 to insure this contact. When, however, the rotary member of the engine is revolving these pistons 26 will be forced alternately into and out of their seats and the arms 19 and ring 18 carrying the same will move radially with relation to the shaft a sufficient distance to permit this movement of the pistons or blocks 26, the ring 18 being of large enough diameter to avoid contact with the hub of the cheek plate 9. At the end 3 of the shaft 1 this shaft is threaded to receive a valve seat 28 having on diametrically opposite sides a steam supply pipe 29 and a steam exhaust pipe 30 tapped into it. The valve seat is suitably shaped to receive a valve head 31 which may be ground steam-tight into the seat and form a steam-tight connection with the contiguous end face of the shaft 1. This valve head 31 is provided with a valve stem 32 to which is attached a manipulating handle 33, and the valve casing is provided with a cap 34 carrying a gland 35 around the valve stem, which gland confines suitable packing 36 to render the valve stem steam-tight, and a boss 37 formed on the inner face of the cap 34 may be provided to force the valve head 31 firmly into its seat. The valve head 31 has two diametrically opposite ports 38—39, the port 38 opening into a cross passage 40 and the port 39 opening into another cross passage 41, both cross passages being formed in the valve head 31 and wide enough so that steam may be admitted to one conduit 4 and exhausted through the diametrically opposite conduit 5, or may be admitted to the other conduit 4 and exhausted through the corresponding other conduit 5.

Let it be assumed that steam is entering through the conduit 4 to the left of Fig. 2 and that the diametrically opposite conduit 5 is the exhaust conduit. The incoming steam will press against the piston 26 within the crescent-shaped space between the rotary member and the stationary head 2 and will drive the rotary member counter-clockwise. This movement continues until the block or piston 26 has reached the exhaust passage, when the steam will exhaust therethrough, but by this time the other piston has reached the inlet passage and is then itself acted upon by the incoming steam. This rotation continues so long as the steam is admitted by the particular passage 4 and is exhausted by the particular passage 5. If the valve head 31 is moved to bring the other two ports into action the direction of movement of the rotor is reversed, as will be readily understood.

Since the shaft is stationary, I may provide any type of support therefor that may be desirable. The supports may be ordinary standards applied to the portions 42 and 43 of the shaft, which latter portions need not be especially prepared since they do not rotate and may at this point be simply left in the rough and the standards be clamped tightly thereto, or brick or stone or cement standards may be built around these portions of the shaft. In fact, it is immaterial what type of standard is used so long as the shaft is held against rotation and the standards or supports be made of sufficient strength for the purposes of the engine.

It will be understood, of course, that by the term "steam engine" I do not wish to confine myself to the use of steam only as the expansive fluid for driving the engine, since compressed air or explosive gases may likewise be used in place of steam.

It will be observed that the inlet passage and exhaust passages 6 are not exactly diametrically disposed but that the pressure side is considerably longer than the exhaust side; in other words, the arc included between the inlet and exhaust openings, in the direction of travel or on the pressure side, exceeds 180 degrees. The entering steam is therefore cut off before the exhaust is opened and the expansive force of the steam is therefore utilized. When the engine is to run in one direction only, a plug may be inserted in the idle exhaust port to prevent possible leakage therethrough. The exhaust ports may be threaded to receive the stopper or plug.

I claim:—

1. In a steam engine, a stationary shaft, an eccentric piston-head fast thereon, a rotary member concentrically mounted on said shaft, pistons carried by said rotary member in contact with the periphery of the stationary piston-head, threaded rods fast to said pistons, a connecting frame having two radial arms with ends bent to overhang the rotary member and receive the threaded ends of the piston-carrying rods, and clamp nuts applied to the rods on each side of the overhanging ends of the connecting frame arms.

2. In a steam engine, a stationary shaft having two steam inlet and two steam exhaust passages therethrough, an eccentrically mounted piston-head having steam passages connected with the shaft passages and opening at the periphery of the piston head, a rotary member concentric with the shaft and having connected radially-movable pistons, and a valve arranged to couple diametrically opposite pairs of the four passages in the shaft to the steam supply and exhaust respectively.

3. In an engine, a stationary shaft, a stationary piston-head carried thereby, a rotor surrounding the stationary piston head, roller bearings between the rotor and the shaft, packing rings exterior to the roller bearings, and glands confining said packing rings and roller bearings and carried by the rotor.

4. In a steam engine, a stationary shaft, a stationary piston-head eccentrically mounted thereon, a rotary member concentrically mounted on the shaft and inclosing the piston-head, simultaneously-movable radial pistons carried by the rotary member, roller bearings interposed between the movable member and the stationary shaft, packing rings exterior to the roller bearings, and glands confining said packing rings and carried by said rotary member.

5. In a steam engine, a stationary shaft having longitudinal steam passages therein, an eccentric piston-head fast on said shaft and having steam passages communicating with those through the shaft and extending to the periphery of the piston-head, a rotary member inclosing said piston-head and mounted concentrically on said shaft, radially-movable pistons carried by said rotary member and connected exterior thereto for simultaneous movement, a valve seat on one end of said shaft, a valve therein having diametrically opposite steam passages movable into communication with the diametrically opposite pairs of the steam passages in the shaft, cross passages in the valve of larger area than the ports therein, and steam inlet and exhaust pipes connected to said valve seat and communicating with the cross passages in the valve.

In testimony that I claim the foregoing as my own, I have hereto affixed my signature in the presence of two witnesses.

LUCAS K. SIVERTSON.

Witnesses:
S. B. MAHANEY,
GRACE V. MAHANEY.